(12) United States Patent
Isaka et al.

(10) Patent No.: US 8,173,419 B2
(45) Date of Patent: *May 8, 2012

(54) EQUIPMENT FOR WASTEWATER TREATMENT COMPRISING ANAEROBIC AMMONIUM OXIDATION VESSEL AND ACCLIMATIZATION VESSEL

(75) Inventors: Kazuichi Isaka, Chiyoda-ku (JP); Tatsuo Sumino, Chiyoda-ku (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 882 days.

This patent is subject to a terminal disclaimer.

(21) Appl. No.: 12/172,078

(22) Filed: Jul. 11, 2008

(65) Prior Publication Data

US 2009/0008315 A1 Jan. 8, 2009

Related U.S. Application Data

(62) Division of application No. 11/126,231, filed on May 11, 2005, now Pat. No. 7,556,961.

(30) Foreign Application Priority Data

May 14, 2004 (JP) ................. 2004-144909

(51) Int. Cl.
- C12M 1/00 (2006.01)
- C02F 3/00 (2006.01)
- C12N 11/02 (2006.01)
- C12N 11/08 (2006.01)
- C12N 1/36 (2006.01)
- A62D 3/02 (2007.01)

(52) U.S. Cl. ............... 435/289.1; 210/601; 435/177; 435/180; 435/245; 435/262.5; 435/396

(58) Field of Classification Search .............. None
See application file for complete search history.

(56) References Cited

U.S. PATENT DOCUMENTS

| | | | |
|---|---|---|---|
| 4,043,936 A | 8/1977 | Francis et al. | |
| 4,167,479 A | 9/1979 | Besik | |
| 4,500,427 A | 2/1985 | Suzuki et al. | |
| 4,824,563 A | 4/1989 | Iwahori et al. | |
| 5,286,385 A | 2/1994 | Jorgensen et al. | |
| 5,616,241 A | 4/1997 | Khudenko | |
| 6,015,496 A | 1/2000 | Khudenko | |
| 6,336,746 B1 | 1/2002 | Matsuura et al. | |
| 6,596,164 B2 | 7/2003 | Oonishi et al. | |
| 6,610,205 B2 | 8/2003 | Sato et al. | |
| 6,627,080 B2 | 9/2003 | Oonishi et al. | |
| 6,893,567 B1 * | 5/2005 | Vanotti et al. | 210/605 |
| 7,384,553 B2 | 6/2008 | Isaka et al. | |
| 2001/0025814 A1 | 10/2001 | Oonishi et al. | |

FOREIGN PATENT DOCUMENTS

| | | |
|---|---|---|
| JP | A-2001-037467 | 2/2001 |
| JP | A-2003-024985 | 1/2003 |
| JP | A-2003-024990 | 1/2003 |
| JP | A-2003-260481 | 9/2003 |
| WO | WO 03/057632 A1 | 7/2003 |

OTHER PUBLICATIONS

Office Action dated Apr. 20, 2010 issued in pending U.S. Appl. No. 11/830,708.
Office Action dated Sep. 9, 2010 issued in pending U.S. Appl. No. 11/830,708.
Office Action dated Nov. 9, 2010 issued in co-pending U.S. Appl. No. 11/830,708.
Office Action in U.S. Appl. No. 12/171,967 mailed Mar. 14, 2011.
Office Action mailed Apr. 18, 2011 issued in U.S. Appl. No. 12/172,056.
Office Action mailed Oct. 14, 2011 issued in U.S. Appl. No. 12/172,056.
Office Action mailed Sep. 1, 2011 in U.S. Appl. No. 12/171,967.

* cited by examiner

*Primary Examiner* — David Naff
(74) *Attorney, Agent, or Firm* — Oliff & Berridge, PLC

(57) ABSTRACT

Equipment for treating wastewater by anaerobic ammonium oxidation includes an anaerobic ammonium oxidation vessel to receive water to be treated containing ammonium and nitrite and to denitrify ammonium and nitrite in the water by anaerobic ammonium oxidizing bacteria, forming denitrified treated water, an acclimatization vessel downstream from the anaerobic ammonium oxidation vessel to receive the denitrified treated water from the anaerobic ammonium oxidation vessel, the acclimization vessel containing an immobilizing material that collects the anaerobic ammonium oxidizing bacteria in the denitrified treated water as immobilized microorganisms attached to the immobilizing material, wherein the acclimatization vessel has a structure such that the immobilizing material is prevented from flowing out of the acclimatization vessel, and a pipe connecting the acclimatization vessel to the anaerobic ammonium oxidation vessel.

14 Claims, 5 Drawing Sheets

EQUIPMENT FOR WASTEWATER TREATMENT COMPRISING ANAEROBIC AMMONIUM OXIDATION VESSEL AND ACCLIMATIZATION VESSEL

This is a Divisional Application of U.S. patent application Ser. No. 11/126,231 filed May 11, 2005 now U.S. Pat. No. 7,556,961. The entire disclosure of the prior application is incorporated by reference herein in its entirety.

BACKGROUND OF THE INVENTION

1. Field of the Invention

The present invention relates to a method and an apparatus for collecting bacterial cells, a method for acclimatizing bacterial cells, and wastewater treatment equipment, in particular, to a technique for collecting anaerobic ammonium oxidizing bacteria used for anaerobic ammonium oxidation and a technique for acclimatizing collected anaerobic ammonium oxidizing bacteria.

2. Description of the Related Art

Nitrogen components contained in sewage and industrial effluent cause eutrophication in lakes and lower the level of dissolved oxygen in rivers, and thus must be removed. Examples of main nitrogen components contained in sewage and industrial effluent include ammonium nitrogen, nitrite nitrogen, nitrate nitrogen, and organic nitrogen.

Conventionally, when nitrogen in such wastewater has a low concentration, ion exchange and oxidation by chlorine or ozone are used to remove nitrogen. When the nitrogen has a medium or high concentration, biological treatment is employed and usually operated in the following conditions.

In the biological treatment, nitrification and denitrification treatment are performed by aerobic nitrification and anaerobic denitrification. In the aerobic nitrification, ammonium nitrogen and nitrite nitrogen are oxidized by ammonium oxidizing bacteria (*Nitrosomonas, Nitrosococcus, Nitrosospira, Nitrosolobus*, etc.), and nitrite oxidizing bacteria (*Nitrobactor, Nitrospina, Nitrococcus, Nitrospira*, etc). On the other hand, in the anaerobic denitrification, denitrification is performed by heterotrophic bacteria (*Pseudomonas denitrificans*, etc.).

A nitrification vessel for aerobic nitrification is operated under a load of 0.2 to 0.3 kg-N/m³/day, and a denitrification vessel for anaerobic denitrification is operated under a load of 0.2 to 0.4 kg-N/m³/day. To treat nitrogen contained in a total concentration of 30 to 40 mg/L in sewage, the sewage must be retained in a nitrification vessel for 6 to 8 hours and in a denitrification vessel for 5 to 8 hours, and large-scale treatment vessels are required. Further, a nitrification vessel and a denitrification vessel are designed to be operated under the loads as described above for industrial effluent containing only inorganic substances. However, denitrification of such wastewater requires organic substances, and thus methanol is added at a concentration three to four times of that of nitrogen. For this reason, not only an initial cost but also a large running cost are required.

In this situation, recently, a method for removing nitrogen comprising anaerobic ammonium oxidation has been attracted attention (for example, Japanese Patent Application Publication No. 2001-37467 and Japanese Patent Application Publication No. 2003-24990). This anaerobic ammonium oxidation is a method comprising simultaneously denitrifying ammonium as a hydrogen donor and nitrite as a hydrogen receptor by anaerobic ammonium oxidizing bacteria according to the following reaction formula:

$$1.0NH_4 + 1.32NO_2 + 0.066HCO_3 + 0.13H^+ \rightarrow 1.02N_2 + 0.26NO_3 + 0.066CH_2O_{0.5}N_{0.15} + 2.03H_2O \quad \text{(Formula 1)}$$

This method has advantages in that ammonium used as a hydrogen donor can considerably reduce the amount of methanol used for denitrification and reduce the amount of a sludge produced, etc. Thus, the method is considered to be an effective method for removing nitrogen in the future.

SUMMARY OF THE INVENTION

However, it is difficult and takes a very long time to attach anaerobic ammonium oxidizing bacteria used for the anaerobic ammonium oxidation to pellets and acclimatize the bacteria (cause the bacteria to proliferate), which is a great obstacle to practical application of the method.

It is reported that the bacteria carrying out anaerobic ammonium oxidation are *Planctomycete*, although the details are not clear, and the bacteria have a very low proliferation rate of $0.001\ h^{-1}$ (Strous, M. et al., Nature, 400, 446 (1999)).

According to Japanese Patent Application Publication No. 2003-24990, the bacteria have a very small specific proliferation rate of 0.02 to $0.05\ day^{-1}$, and it takes 14 to 35 culture days to double the amount of the bacterial cells.

To immobilize anaerobic ammonium oxidizing bacteria on pellets, it is necessary to attach the bacteria to an immobilizing material and cause the bacteria to proliferate first. However, since the proliferation rate is small as described above, even this attachment stage takes a long time.

Actual production equipment of a nitrogen removal system utilizing anaerobic ammonium oxidation has not been operated in Japan so far. Accordingly, when actual production is started, due to an activated sludge or the like, it is necessary to start production after a long acclimatization period required, or to provide a culturing plant manufactured by a plant manufacturer, etc. for culturing anaerobic ammonium oxidizing bacteria.

Because of the above circumstances, when starting operation of a wastewater treatment system utilizing anaerobic ammonium oxidizing bacteria, the system requires a long acclimatization period that has not been underwent in acclimatization of conventional wastewater treatment.

In the system to be practically used, not only is a huge plant to be provided, which requires expensive equipment and operation management costs for operation, but also a large amount of nitrogen wastewater must be controlled.

The present invention has been achieved in view of such circumstances. An object of the present invention is to provide a method and an apparatus for collecting bacterial cells, a method for acclimatizing bacterial cells, and wastewater treatment equipment which can efficiently collect highly active anaerobic ammonium oxidizing bacteria from water treated in an anaerobic ammonium oxidation vessel, can carry out acclimatization in a short time by utilizing the collected anaerobic ammonium oxidizing bacteria, and thus can not only solve the above problems but also improve performance of anaerobic ammonium oxidation.

According to a first aspect of the present invention, to attain the aforementioned object, there is provided a method for collecting bacterial cells comprising the steps of: feeding water to be treated containing ammonium and nitrite to an anaerobic ammonium oxidation vessel to denitrify ammonium and nitrite by anaerobic ammonium oxidizing bacteria; and feeding the denitrified treated water to an acclimatization vessel or returning the water through the acclimatization vessel to the anaerobic ammonium oxidation vessel to collect anaerobic ammonium oxidizing bacteria in the treated water as immobilized microorganisms attached to an immobilizing material in the acclimatization vessel.

As a result of extensive studies, the inventors of the present application have confirmed that anaerobic ammonium oxidizing bacteria exist in treated water obtained by treating water to be treated containing ammonium and nitrite by anaerobic ammonium oxidation, although the amount is as small as several mg/L, and the bacteria are highly active.

Accordingly, by feeding the treated water to an acclimatization vessel with an immobilizing material or returning the water through the acclimatization vessel to an anaerobic ammonium oxidation vessel, anaerobic ammonium oxidizing bacteria in the treated water can be collected as immobilized microorganisms attached to the immobilizing material in the acclimatization vessel. By acclimatizing the collected immobilized microorganisms, the time for acclimatizing anaerobic ammonium oxidizing bacteria can be considerably reduced as compared with the prior art.

According to the present invention, since anaerobic ammonium oxidizing bacteria can be acclimatized in a short time, anaerobic ammonium oxidation can exhibit improved performance, and the apparatus does not need to have a large size.

According to a second aspect of the present invention, there is provided the method for collecting bacterial cells according to the first aspect, wherein the immobilizing material for immobilized microorganisms is one of pellets and an immobilized bed. Any pellets or immobilized bed may be used as the immobilizing material for immobilized microorganisms. When immobilized microorganisms are introduced into or placed in an anaerobic ammonium oxidation vessel in which acclimatization is to be started, anaerobic ammonium oxidizing bacteria can be prevented from being flown out from the anaerobic ammonium oxidation vessel, and acclimatization in the anaerobic ammonium oxidation vessel can be carried out in a further shorter period.

According to a third aspect of the present invention, to attain the aforementioned object, there is provided a method for collecting bacterial cells comprising the steps of: feeding water to be treated containing ammonium and nitrite to an anaerobic ammonium oxidation vessel to denitrify ammonium and nitrite by anaerobic ammonium oxidizing bacteria; and feeding the denitrified treated water to a precipitation vessel or membrane separation unit or returning the water through the precipitation vessel or membrane separation unit to the anaerobic ammonium oxidation vessel to collect anaerobic ammonium oxidizing bacteria in the treated water in a separated sludge obtained by solid-liquid separation in the precipitation vessel or membrane separation in the membrane separation unit.

In the above first aspect, anaerobic ammonium oxidizing bacteria are collected as immobilized microorganisms attached to an immobilizing material. In contrast, in the third aspect, a sludge of bacterial cells, specifically, bacterial cells themselves of anaerobic ammonium oxidizing bacteria are collected. The collected sludge of bacterial cells may be introduced as is into an anaerobic ammonium oxidation vessel in which acclimatization is to be carried out, or may be directly attached to an immobilizing material and introduced into an anaerobic ammonium oxidation vessel in which acclimatization is to be started. In this case, the immobilizing material is not limited to an immobilizing material to which the sludge of bacterial cells is attached such as pellets or immobilized bed. Entrapping immobilization pellets in which the sludge of bacterial cells is entrapped and immobilized in a gel may be used as the immobilizing material.

According to a fourth aspect of the present invention, there is provided the method for collecting bacterial cells according to the third aspect, wherein the membrane separation unit is a rotary flat membrane unit. This is because, although a membrane such as a rotary flat membrane, immersion membrane, or hollow fiber membrane may be used in the membrane separation unit, it is preferable to use a rotary flat membrane to maintain the life of the membrane for a long time.

According to a fifth aspect of the present invention, to attain the aforementioned object, there is provided a method for collecting bacterial cells comprising the steps of: feeding water to be treated containing ammonium and nitrite to an anaerobic ammonium oxidation vessel to denitrify ammonium and nitrite by anaerobic ammonium oxidizing bacteria; and feeding the denitrified treated water to a precipitation vessel, in which an acclimatization container is stored, to cause anaerobic ammonium oxidizing bacteria in the treated water to be attached to an immobilizing material in the acclimatization container, so that the anaerobic ammonium oxidizing bacteria are collected, and, at the same time, to collect anaerobic ammonium oxidizing bacteria in a separated sludge obtained by solid-liquid separation in the precipitation vessel.

According to the fifth aspect, not only anaerobic ammonium oxidizing bacteria as immobilized microorganisms but also bacterial cells themselves of anaerobic ammonium oxidizing bacteria can be collected. Specifically, among anaerobic ammonium oxidizing bacterias in treated water anaerobic ammonium oxidizing bacteria floating in the treated water are attached to the immobilizing material and collected, and anaerobic ammonium oxidizing bacteria in a sludge flown out in company with the treated water are precipitated and collected as a sludge of bacterial cells. Thus, all anaerobic ammonium oxidizing bacteria in the treated water can be efficiently collected.

According to a sixth aspect of the present invention, to attain the aforementioned object, there is provided an apparatus for collecting bacterial cells, which is configured to carry out the method for collecting bacterial cells according to any one of the first to fifth aspects.

The apparatus has a configuration for applying the method for collecting bacterial cells of the present invention, and thus can efficiently collect highly active anaerobic ammonium oxidizing bacteria remaining in water treated by anaerobic ammonium oxidation. Therefore, the acclimatization period can be considerably reduced when the collected anaerobic ammonium oxidizing bacteria are used for acclimatization as inoculum.

According to a seventh aspect of the present invention, to attain the aforementioned object, there is provided a method for acclimatizing anaerobic ammonium oxidizing bacteria, comprising the step of acclimatizing anaerobic ammonium oxidizing bacteria as inoculum collected by the method for collecting bacterial cells according to any one of the first to fifth aspects in an acclimatization vessel or an anaerobic ammonium oxidation vessel to be started up.

In this case, the acclimatization period can be reduced by returning anaerobic ammonium oxidizing bacteria collected by the present invention from treated water of an anaerobic ammonium oxidation vessel in which acclimatization is in progress to the anaerobic ammonium oxidation vessel in which acclimatization is in progress. Alternatively, the acclimatization period can be reduced by using anaerobic ammonium oxidizing bacteria collected from treated water of an anaerobic ammonium oxidation vessel in which acclimatization is completed as inoculum for another anaerobic ammonium oxidation vessel in which acclimatization is to be started or an acclimatization vessel separately prepared.

According to an eighth aspect of the present invention, to attain the aforementioned object, there is provided equipment for treating wastewater by anaerobic ammonium oxidation, the wastewater treatment equipment comprising the apparatus for collecting bacterial cells according to the sixth aspect.

With the apparatus for collecting bacterial cells of the present invention provided as a part of equipment for treating wastewater by anaerobic ammonium oxidation, highly active anaerobic ammonium oxidizing bacteria in treated water can be efficiently collected. By starting up an anaerobic ammonium oxidation vessel utilizing the collected anaerobic ammonium oxidizing bacteria, the acclimatization period can be considerably reduced.

As described above, the method and the apparatus for collecting bacterial cells of the present invention can efficiently collect highly active anaerobic ammonium oxidizing bacteria from water treated in an anaerobic ammonium oxidation vessel.

In addition, the method for acclimatizing anaerobic ammonium oxidizing bacteria of the present invention comprises carrying out acclimatization using, as inoculum, anaerobic ammonium oxidizing bacteria collected by the method for collecting bacterial cells of the present invention, and therefore can reduce the acclimatization period considerably, solve the problems of the prior art, and improve performance of anaerobic ammonium oxidation.

Further, the wastewater treatment equipment comprising the apparatus for collecting bacterial cells of the present invention as a part of the configuration can efficiently collect highly active anaerobic ammonium oxidizing bacteria in treated water. By starting up an anaerobic ammonium oxidation vessel utilizing the collected anaerobic ammonium oxidizing bacteria, the acclimatization period can be considerably reduced.

DETAILED DESCRIPTION OF THE PREFERRED EMBODIMENTS

Preferred embodiments of the method and the apparatus for collecting bacterial cells, the method for acclimatizing bacterial cells, and the wastewater treatment equipment of the present invention will be described below by way of the accompanying drawings.

Figure 1:
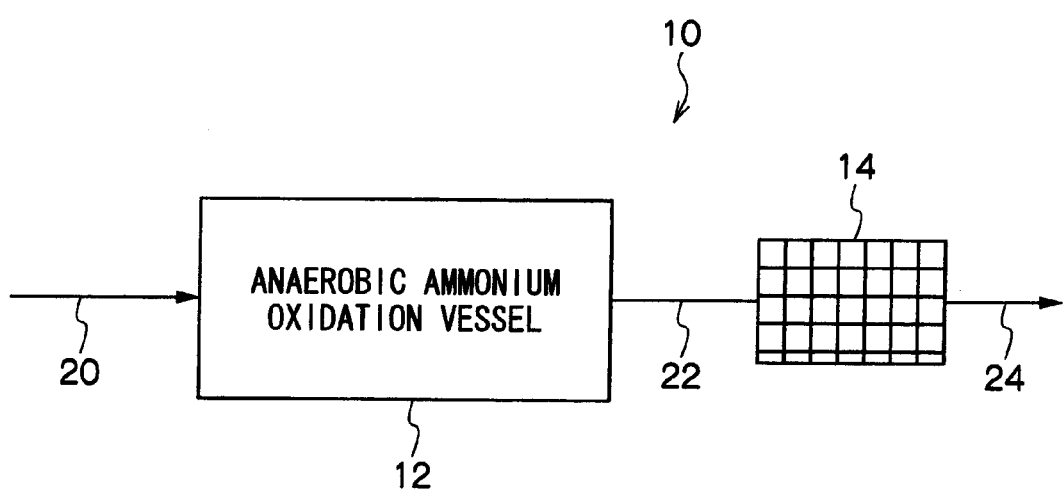
FIG. 1 is a conceptual view for describing the entire configuration of wastewater treatment equipment by anaerobic oxidation, comprising the apparatus for collecting bacterial cells according to a first embodiment of the present invention.

FIG. 1 is a conceptual view for describing the entire configuration of wastewater treatment equipment 10 by anaerobic ammonium oxidation, comprising the apparatus for collecting bacterial cells according to a first embodiment of the present invention.

As shown in FIG. 1, the wastewater treatment equipment 10 is configured by providing, as a main constituent, an acclimatization vessel 14 for collecting and acclimatizing anaerobic ammonium oxidizing bacteria downstream to an anaerobic ammonium oxidation vessel 12. Here, the apparatus for collecting bacterial cells consists of the acclimatization vessel 14.

Water to be treated containing ammonium and nitrite flowing in a raw water pipe 20 is fed to the anaerobic ammonium oxidation vessel 12 by a pump (not shown). The water treated in the anaerobic ammonium oxidation vessel 12 is fed through a first pipe 22 to the acclimatization vessel 14, and is discharged from the acclimatization vessel 14 through a treated water pipe 24 to outside the system.

Water to be treated (raw water) containing ammonium and nitrite is flown into the anaerobic ammonium oxidation vessel 12, and ammonium and nitrite contained in the raw water are simultaneously denitrified by anaerobic ammonium oxidizing bacteria in the anaerobic ammonium oxidation vessel 12.

The acclimatization vessel 14 includes one of pellets and an immobilized bed as an immobilizing material. When the treated water is brought into contact with the immobilizing material, anaerobic ammonium oxidizing bacteria in the treated water are attached to the immobilizing material. Immobilized microorganisms with anaerobic ammonium oxidizing bacteria attached to and immobilized on the immobilizing material are thus formed. With the immobilized microorganisms formed, anaerobic ammonium oxidizing bacteria in the treated water are collected.

The acclimatization vessel 14 is preferably closed, and preferably has a structure into or from which the immobilizing material can be moved. For example, it is efficient if the immobilizing material is previously put in a container with a unit structure through which water can permeate and from which the immobilizing material is prevented from flowing out, such as a box made of a wire mesh or plastic mesh, and the container is dipped in or taken from the acclimatization vessel 14. Further, a pressure gauge is preferably installed upstream or downstream to the acclimatization vessel 14. This is because operation of the anaerobic ammonium oxidation vessel 12 is stopped when the acclimatization vessel 14 is blocked, but such a trouble can be prevented if the pressure upstream or downstream to the acclimatization vessel 14 can be detected. The acclimatization vessel 14 does not necessarily have to be configured as a "vessel", and may be incorporated in the treated water pipe 22.

As described above, such anaerobic ammonium oxidizing bacteria have a very low proliferation rate. However, by providing the acclimatization vessel 14 downstream of the anaerobic ammonium oxidation vessel 12 in this manner, highly active anaerobic ammonium oxidizing bacteria in treated water of the anaerobic ammonium oxidation vessel 12 can be collected as immobilized microorganisms and acclimatized in the acclimatization vessel 14. Further, the collected active anaerobic ammonium oxidizing bacteria may be acclimatized in another acclimatization vessel, or may be introduced into or placed in an anaerobic ammonium oxidation vessel to be started up, and acclimatized. Thus, the acclimatization period can be considerably reduced as compared with acclimatization from a usual activated sludge.

Examples of the material for pellets as an immobilizing material include, but are not specifically limited to, gels of polyvinyl alcohol, alginic acid, and polyethylene glycol; and plastic pellets of cellulose, polyester, polypropylene, and vinyl chloride. Pellets are preferably formed in the shape of a sphere, a cylinder, a porous material, a cube, a sponge, a honeycomb, or the like.

Further, granules utilizing self-granulation of microbes may be used.

Examples of the material for an immobilized bed as an immobilizing material include, but are not specifically limited to, plastic materials of polyethylene, polyester, polypropylene, and vinyl chloride; and active carbon fibers. Examples of the shape of an immobilized bed include, but are not specifically limited to, a shape formed into a fiber, a chrysanthemum, or a honeycomb. Further, an immobilized bed may be formed by packing a basket or the like with microbes immobilized on the above-described pellets or microbes immobilized on the granules.

According to the apparatus for collecting bacterial cells 10 with such a configuration, denitrified treated water is fed to the acclimatization vessel 14, and anaerobic ammonium oxidizing bacteria are attached to and immobilized on the immobilizing material in the acclimatization vessel 14. Since anaerobic ammonium oxidizing bacteria have a small amount but are highly active, the anaerobic ammonium oxidizing bacteria can be attached to the immobilizing material only by dipping the immobilizing material in the treated water in the acclimatization vessel 14. Thus, the time for acclimatizing anaerobic ammonium oxidizing bacteria can be considerably reduced as compared with the prior art.

Figure 2:
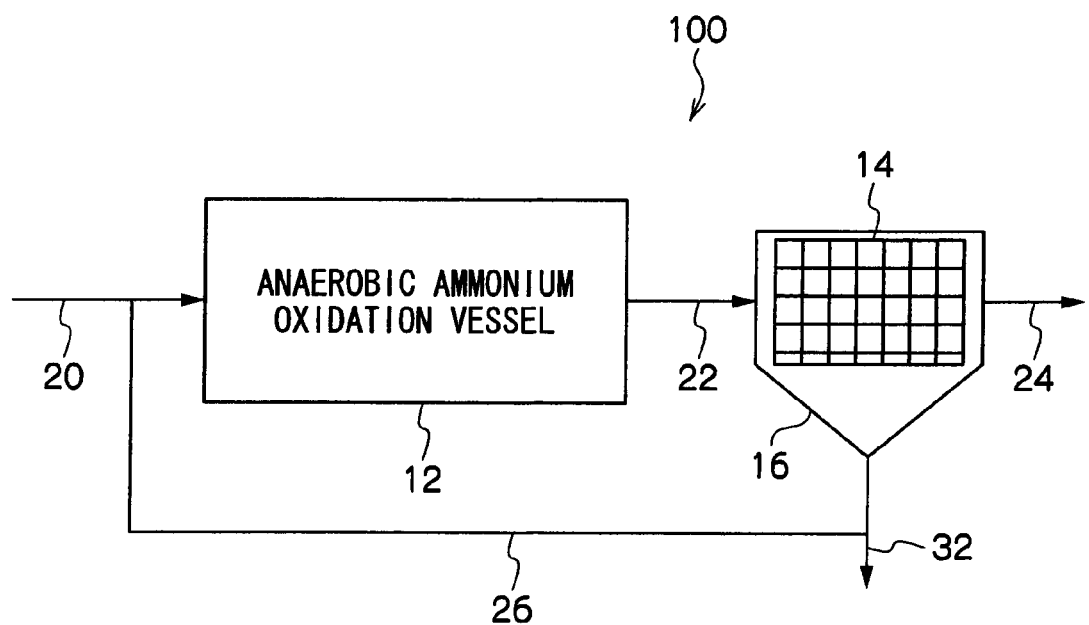
FIG. 2 is a conceptual view for describing the entire configuration of wastewater treatment equipment by anaerobic ammonium oxidation, comprising the apparatus for collecting bacterial cells according to a second embodiment of the present invention.

FIG. 2 is a conceptual view for describing the entire configuration of wastewater treatment equipment 100 by anaerobic ammonium oxidation, comprising the apparatus for collecting bacterial cells according to a second embodiment of the present invention. Here, the apparatus for collecting bacterial cells consists of an acclimatization vessel and a precipitation vessel. The same apparatus or member as in FIG. 1 will be described with the same reference numeral, and repetition of the same description is omitted.

The present embodiment differs from the first embodiment in FIG. 1 in that the embodiment has a configuration in which a precipitation vessel 16 is installed downstream of an anaerobic ammonium oxidation vessel 12, and an acclimatization vessel 14 or an acclimatization container is installed in the upper part of the precipitation vessel 16. Thus, among anaerobic ammonium oxidizing bacterials in treated water anaerobic ammonium oxidizing bacteria floating in treated water are attached to an immobilizing material in the acclimatization vessel 14 and collected as immobilized microorganisms as in the first embodiment. Further, anaerobic ammonium oxidizing bacteria in a sludge flown out in company with the treated water are precipitated and collected as a sludge of bacterial cells. Therefore, all anaerobic ammonium oxidizing bacteria in the treated water can be efficiently collected. The sludge of bacterial cells precipitated in the precipitation vessel 16 may be fed through a second pipe 26 back to the anaerobic ammonium oxidation vessel 12, or may be discharged through a sludge discharge pipe 32 to outside the system. The sludge of bacterial cells discharged to outside the system may be introduced into another acclimatization vessel or another anaerobic ammonium oxidation vessel 12 to be started up and acclimatized as inoculum. Alternatively, the sludge may be directly attached to and immobilized on an immobilizing material, or entrapped and immobilized in an immobilizing material, to form immobilized microorganisms and introduce the immobilized microorganisms into another acclimatization vessel or anaerobic ammonium oxidation vessel. If a membrane separation unit (not shown) is used instead of the precipitation vessel 16, the unit can act and exhibit the effect in the same manner.

Figure 3:
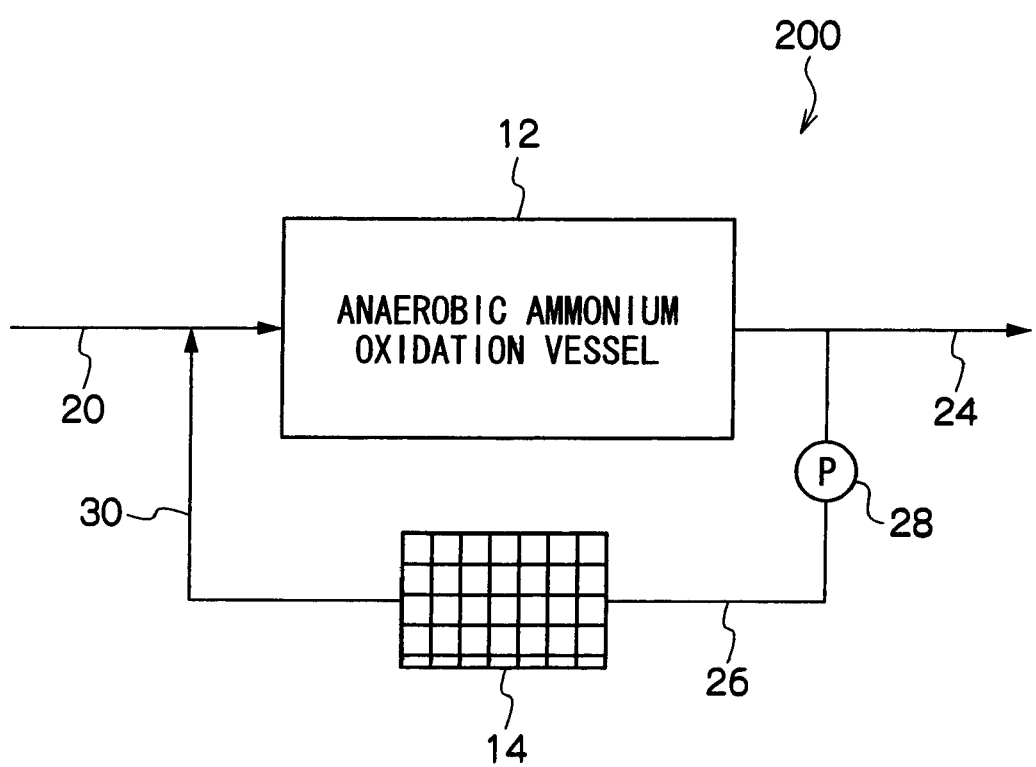
FIG. 3 is a conceptual view for describing the entire configuration of wastewater treatment equipment, which shows a modification of the first embodiment.

FIG. 3 shows wastewater treatment equipment 200 showing a modification of the first embodiment, in which an acclimatization vessel 14 is provided in a returning line that causes a part or whole of water treated in an anaerobic ammonium oxidation vessel 12 to flow into the inlet of the anaerobic ammonium oxidation vessel 12 again. The same apparatus or member as in FIG. 1 will be described with the same reference numeral, and repetition of the same description is omitted.

Specifically, a part or whole of water treated in the anaerobic ammonium oxidation vessel 12 is fed through a second pipe 26 as a feedback pipe to the acclimatization vessel 14, and second water treated in the acclimatization vessel 14 is returned through a third pipe 30 as a feedback pipe to the anaerobic ammonium oxidation vessel 12. A returning pump 28 is provided in the second pipe 26 as a feedback pipe.

Thus, only by dipping an immobilizing material such as pellets, granules, or an immobilized bed that can immobilize anaerobic ammonium oxidizing bacteria thereon in returning water (acclimatization vessel 14), anaerobic ammonium oxidizing bacteria can be attached to the immobilizing material. Accordingly, anaerobic ammonium oxidizing bacteria can be efficiently collected, and immobilized microorganisms in which anaerobic ammonium oxidizing bacteria are attached to the immobilizing material in the acclimatization vessel 14 can be efficiently acclimatized. The anaerobic ammonium oxidizing bacteria collected in the acclimatization vessel 14 may be acclimatized in an acclimatization vessel separately prepared, or may be acclimatized in an anaerobic ammonium oxidation vessel to be started up. Thus, the acclimatization period can be considerably reduced as compared with acclimatization from a usual activated sludge.

Figure 4:
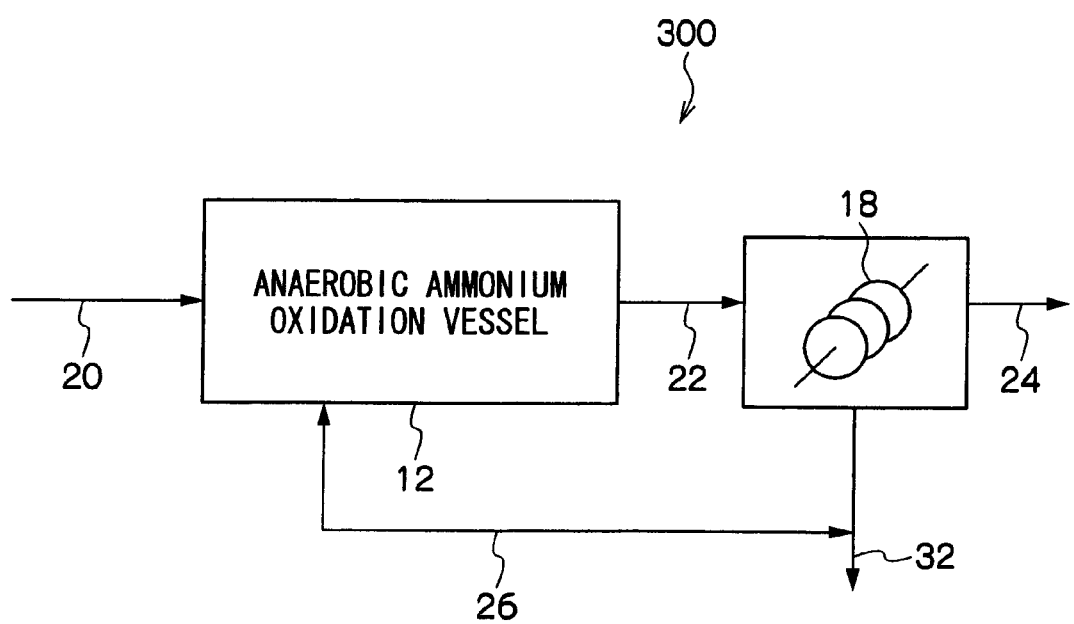
FIG. 4 is a conceptual view for describing the entire configuration of wastewater treatment equipment by anaerobic ammonium oxidation, comprising the apparatus for collecting bacterial cells according to a third embodiment of the present invention.

FIG. 4 is a conceptual view for describing the entire configuration of wastewater treatment equipment 300 by anaerobic ammonium oxidation, comprising the apparatus for collecting bacterial cells according to a third embodiment of the present invention. The same apparatus or member as in FIG. 1 will be described with the same reference numeral, and repetition of the same description is omitted. Here, the apparatus for collecting bacterial cells consists of a rotary flat membrane unit.

The present embodiment differs from the first embodiment in FIG. 1 in that water to be treated containing ammonium and nitrite is denitrified in an anaerobic ammonium oxidation vessel 12, and the treated water is membrane separated using a rotary flat membrane separation unit 18 to acquire and collect anaerobic ammonium oxidizing bacteria on the membrane surface, together with a sludge flown out from the anaerobic ammonium oxidation vessel 12 in company with the treated water.

Specifically, water treated in the anaerobic ammonium oxidation vessel 12 is fed through a first pipe 22 to the rotary flat membrane separation unit 18 and membrane separated. The treated water from which a sludge is removed by membrane separation is discharged through a treated water pipe 24 to outside the system, and the concentrated solution of which the sludge concentration increases due to the membrane separation is returned through a second pipe 26 as a feedback pipe to the anaerobic ammonium oxidation vessel 12.

The rotary flat membrane separation unit 18 is to collect bacterial cells washed out from treated water, and can collect a small amount of anaerobic ammonium oxidizing bacteria in treated water or returning water. A sludge of bacterial cells containing anaerobic ammonium oxidizing bacteria, acquired and collected on the membrane surface of the membrane separation unit 18, can be introduced into an anaerobic ammonium oxidation vessel to be started up. By collecting a sludge itself of bacterial cells containing anaerobic ammonium oxidizing bacteria in this manner, not only microbes immobilized by attachment, but also entrapping immobilization pellets in which the sludge of bacterial cells is entrapped and immobilized in a gel can be formed.

Examples of the membrane separation device include, in addition to the rotary flat membrane separation unit 18, a membrane separation unit using an immersion membrane or a hollow fiber membrane. In this membrane separation device, the membrane surface must not be washed by aeration. This is because the collected anaerobic ammonium oxidizing bacteria are killed by washing by aeration. Of a rotary flat membrane, an immersion membrane, and a hollow fiber membrane, a rotary flat membrane is preferably used to maintain the membrane life for a long time.

The membrane separation device may be used for feeding back the sludge collected by membrane separation, when laboratory equipment is started up.

Figure 5:
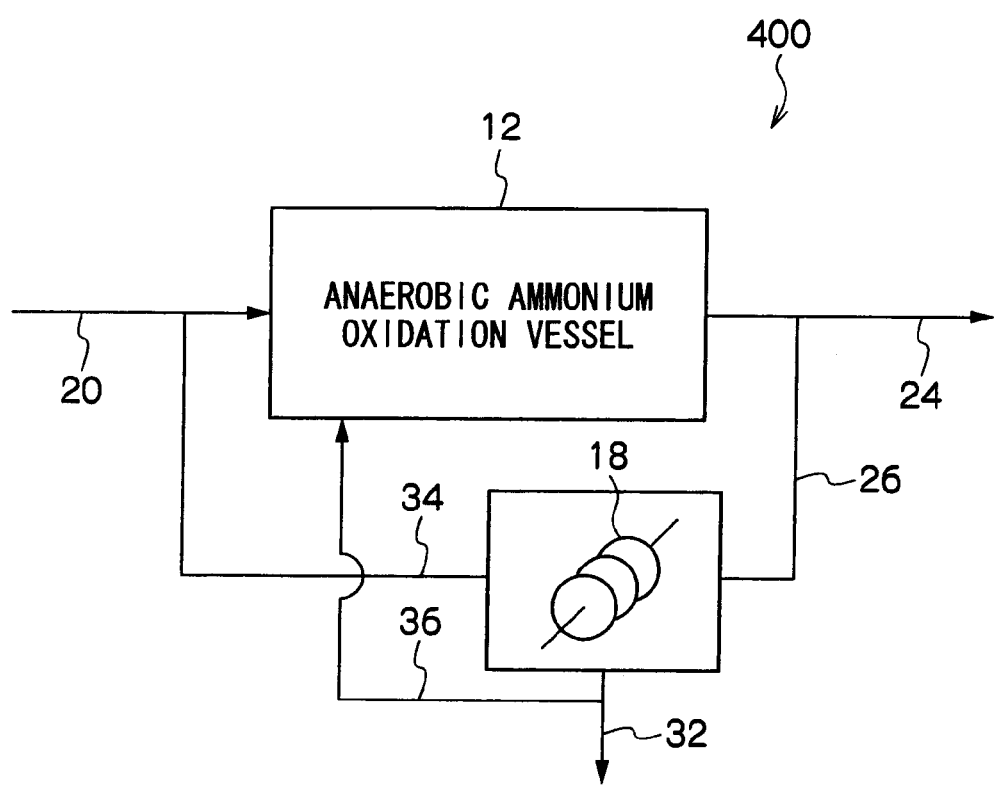
FIG. 5 is a conceptual view for describing the entire configuration of wastewater treatment equipment, which shows a modification of the third embodiment.

FIG. 5 is a conceptual view for describing the entire configuration of wastewater treatment equipment 400, which shows a modification of FIG. 4. The same apparatus or member as in FIGS. 1 and 4 will be described with the same reference numeral, and repetition of the same description is omitted.

The present embodiment differs from the fourth embodiment in FIG. 4 in that the equipment is configured so that a rotary flat membrane separation unit 18 can discharge a sludge of bacterial cells of anaerobic ammonium oxidizing bacteria acquired and collected on the membrane surface to outside the system or feed back the sludge to an anaerobic ammonium oxidation vessel 12.

Specifically, water treated in the anaerobic ammonium oxidation vessel 12 diverges, and a part of the water is discharged through a treated water pipe 24 to outside the system. The remaining treated water is fed through a second pipe 26 as a feedback pipe to the rotary flat membrane separation unit 18. The concentrated solution with a high sludge concentration separated in the membrane separation unit 18 is returned through a fourth pipe 34 as a feedback pipe to the anaerobic ammonium oxidation vessel 12. A part of the sludge of bacterial cells containing anaerobic ammonium oxidizing bacteria acquired and collected on the membrane surface in the membrane separation unit 18 can be returned through a fifth pipe 36 as a sludge feedback pipe to the anaerobic ammonium oxidation vessel 12, or can be discharged through a sludge discharge pipe 32 to outside the system. The sludge discharged to outside the system may be introduced into an anaerobic ammonium oxidation vessel to be started up, or may be used for forming immobilized microorganisms in which the sludge of bacterial cells are attached to and immobilized on an immobilizing material or immobilized microorganisms in which the sludge of bacterial cells is entrapped and immobilized in a gel.

EXAMPLES

Examples of the present invention will be described below. However, the present invention should not be limited to these examples.

Example 1

A test of acclimatization of anaerobic ammonium oxidizing bacteria was carried out using wastewater treatment equipment 10 of anaerobic ammonium oxidation shown in FIG. 1.

(Wastewater Subjected to Test)

As the wastewater subjected to the test, inorganic synthesized wastewater was used.

As the raw water composition, a composition shown in Table 1 was used with reference to A. A. van de Graaf et al., Microbiology (1996), 142, pp. 2187-2196. Operation was carried out by changing the nitrite nitrogen ($NO_2$—N) concentration and the ammonium nitrogen ($NH_4$—N) concentration.

TABLE 1

| Substrate | Amount added |
| --- | --- |
| $NaNO_2$ | 172-1330 (mg/L) |
| $(NH_4)SO_4$ | 175-1350 (mg/L) |
| $KHCO_3$ | 500 (mg/L) |
| $KH_2PO_4$ | 27 (mg/L) |
| $MgSO_4 \cdot 7H_2O$ | 300 (mg/L) |
| $CaCl_2 \cdot 2H_2O$ | 180 (mg/L) |
| T. EllementS1 | 1 (mL/L) |
| T. EllementS2 | 1 (mL/L) |

(Remarks)
T. Ellement S1: EDTA: 5 g/L, $FeSO_4$: 5 g/L
T. Ellement S2: EDTA: 15 g/L, $ZnSO_4 \cdot 7H_2O$: 0.43 g/L, $CoCl_2 \cdot 6H_2O$: 0.24 g/L, $MnCl_2 \cdot 4H_2O$: 0.99 g/L, $CuSO_4 \cdot 5H_2O$: 0.25 g/L, $NaMoO_4 \cdot 2H_2O$: 0.22 g/L, $NiCl_2 \cdot 6H_2O$: 0.19 g/L, $NaSeO_4 \cdot 10H_2O$: 0.21 g/L, $H_3BO_4$: 0.014 g/L (Treatment Conditions)

Operation was carried out at a water temperature of 36° C., at an HRT of 3 hours, and at a denitrification rate of 2.8 to 3.2 kg-N/m$^3$/day. The SS concentration in the treated water at this time was 0.2 to 2.0 mg/L. A nonwoven biomass carrier was put in an acclimatization vessel 14 in FIG. 1 as an immobilizing material. After dipping for about 3 weeks, the nonwoven biomass carrier was taken out and subjected to the following continuous flow test.

The wastewater was adjusted to have an $NH_4$—N concentration of 35 mg/L and an $NO_2$—N concentration of 35 mg/L with reference to Table 1, and acclimatization was carried out at an HRT of 6 hours to gradually raise the nitrogen concentration in the raw water. As a result, the denitrification rate reached 2.8 kg-N/m$^3$/day on the 42nd day after starting the operation. Thus, it was confirmed that the acclimatization was successful.

Comparative Example 1

A test was carried out under the same operation conditions as in Example 1, except for using a completely brand-new nonwoven biomass carrier.

The acclimatization vessel was packed with a brand-new nonwoven biomass carrier, and a sludge of anaerobic ammonium oxidizing bacteria was added thereto. As in Example 1 (volume in vessel: 300 mg/L, on a total volume basis), the wastewater was adjusted to have an $NH_4$—N concentration of 35 mg/L and an $NO_2$—N concentration of 35 mg/L, and acclimatization was carried out at an HRT of 6 hours. After 60 days, it was confirmed that the acclimatization vessel was finally started up.

It is known that a sludge of anaerobic ammonium oxidizing bacteria can be turned into a sedimentary floc. Further, since bacterial cells other than the bacteria are dispersed and washed out, it is difficult to cause the cells to be attached to a nonwoven biomass carrier in a vessel.

Specifically, the method for collecting bacterial cells of the present invention is to form inoculum for the start-up. Not the entire process of acclimatization is carried out by using the inoculum. However, since the anaerobic ammonium oxidizing bacteria proliferate only with difficulty, it is difficult to form inoculum from the bacteria. Therefore, it can be presumed that, by starting up an anaerobic ammonium oxidation vessel using inoculum formed by the method for collecting bacterial cells of the present invention, the acclimatization period can be considerably reduced.

Example 2

A test of acclimatization of anaerobic ammonium oxidizing bacteria was carried out using wastewater treatment equipment 200 of anaerobic ammonium oxidation shown in FIG. 3. After dipping methane granules, with which an acclimatization vessel 14 was packed, in returning water for about 10 days, the test was carried out using an UASB (Upflow Anaerobic Sludge Blanket) reactor.

An anaerobic ammonium oxidation vessel 12 as a source of returning lines 26 and 30 was operated under the same conditions as in Example 1 at a water temperature of 36° C., at an HRT of 3 hours, and at a denitrification rate of 2.8 to 3.2 kg-N/m$^3$/day.

In the same manner as in Example 1, the wastewater was adjusted to have an NH$_4$—N concentration of 35 mg/L and an NO$_2$—N concentration of 35 mg/L, and acclimatization was carried out at an HRT of 6 hours to gradually raise the nitrogen concentration in the raw water. As a result, the denitrification rate reached 2.1 kg-N/m$^3$/day on the 38th day after starting the operation. Thus, it was confirmed that the acclimatization was successful.

Example 3

A test of acclimatization of anaerobic ammonium oxidizing bacteria was carried out using wastewater treatment equipment 300 of anaerobic ammonium oxidation shown in FIG. 4.

A sludge of bacterial cells containing anaerobic ammonium oxidizing bacteria acquired and collected on the membrane surface of a rotary flat membrane separation unit 18 was entrapped and immobilized to obtain entrapping immobilization pellets of anaerobic ammonium oxidizing bacteria. As an immobilizing gel, a polyethylene glycol gel was used. The amount of the bacterial cells immobilized in the pellets was 2.5% on a dry weight basis.

In the same manner as in Example 1, the wastewater was adjusted to have an NH$_4$—N concentration of 35 mg/L and an NO$_2$—N concentration of 35 mg/L, and acclimatization was carried out at an HRT of 6 hours to gradually raise the nitrogen concentration in the raw water. As a result, the denitrification rate reached 2.6 kg-N/m$^3$/day on the 28th day after starting the operation. Thus, it was confirmed that the acclimatization can be achieved in a short period.

Example 4

An operation start-up test was carried out using wastewater treatment equipment 400 of anaerobic ammonium oxidation shown in FIG. 5.

Specifically, acclimatization was carried out in an anaerobic ammonium oxidation vessel 12 while feeding back all the sludge of bacterial cells containing anaerobic ammonium oxidizing bacteria acquired and collected on the membrane surface of a rotary flat membrane separation unit 18 to the anaerobic ammonium oxidation vessel 12. A test was also carried out for a system not comprising the membrane separation unit 18 as a comparative example to conduct a comparative review.

Sponge pellets coated with a polyvinyl alcohol gel were introduced into the anaerobic ammonium oxidation vessel 12, and the sludge of bacterial cells acquired and collected in the membrane separation unit 18 was added, so that the concentration of SS in the vessel 12 was 200 mg/L, to start operation.

As a result, the time required for confirming that the denitrification rate reached 1.0 kg-N/m$^3$/day was 38 days in the case of the system without the membrane separation unit 18 (Comparative Example) and 20 days in the case of the system with the membrane separation unit 18 (Example). Specifically, the present invention could reduce the acclimatization period to about the half.

What is claimed is:

1. Equipment for treating wastewater by anaerobic ammonium oxidation, the wastewater treatment equipment comprising:
an anaerobic ammonium oxidation vessel containing an anaerobic ammonium oxidizing bacteria to receive water to be treated containing ammonium and nitrite and to denitrify ammonium and nitrite in the water by the anaerobic ammonium oxidizing bacteria, forming denitrified water;
an acclimatization vessel downstream from the anaerobic ammonium oxidation vessel to receive the denitrified water from the anaerobic ammonium oxidation vessel, wherein the denitrified water received in the acclimatization vessel includes anaerobic ammonium oxidizing bacteria, the acclimatization vessel containing an immobilizing material that collects the anaerobic ammonium oxidizing bacteria in the denitrified water as immobilized microorganisms attached to the immobilizing material, wherein the acclimatization vessel has a structure such that the immobilizing material is prevented from flowing out of the acclimatization vessel; and
a pipe connecting the acclimatization vessel to the anaerobic ammonium oxidation vessel.

2. The equipment for treating wastewater by anaerobic ammonium oxidation according to claim 1, wherein the immobilizing material is one of pellets and an immobilized bed.

3. The equipment for treating wastewater by anaerobic ammonium oxidation according to claim 2, wherein the immobilizing material is pellets of polyvinyl alcohol gel, alginic acid gel, polyethylene glycol gel, cellulose, polyester, polypropylene or vinyl chloride.

4. The equipment for treating wastewater by anaerobic ammonium oxidation according to claim 3, wherein the pellets are in a shape of a sphere, a cylinder, a porous material, a cube, a sponge or a honeycomb.

5. The equipment for treating wastewater by anaerobic ammonium oxidation according to claim 2, wherein the immobilizing material is an immobilized bed of polyethylene, polyester, polypropylene or vinyl chloride, or of active carbon fibers.

6. The equipment for treating wastewater by anaerobic ammonium oxidation according to claim 5, wherein the immobilized bed has a shape of a fiber, a chrysanthemum, or a honeycomb.

7. The equipment for treating wastewater by anaerobic ammonium oxidation according to claim 1, wherein a pressure gauge is installed upstream or downstream of the acclimatization vessel.

8. Equipment for treating wastewater by anaerobic ammonium oxidation, the wastewater treatment equipment comprising:
an anaerobic ammonium oxidation vessel to receive water to be treated containing ammonium and nitrite and to denitrify ammonium and nitrite in the water by anaerobic ammonium oxidizing bacteria, forming denitrified water; and a pipe connected to the anaerobic ammonium oxidation vessel to receive the denitrified water from the anaerobic ammonium oxidation vessel, the denitrified water from the anaerobic ammonium oxidation vessel flowing through the pipe to outside the equipment, wherein the denitrified water received in the pipe includes anaerobic ammonium oxidizing bacteria, the pipe being an acclimatization vessel, the pipe containing an immobilizing material that collects the anaerobic ammonium oxidizing bacteria in the denitrified water as immobilized microorganisms attached to the immobilizing material, wherein the pipe has a structure such that the immobilizing material is prevented from flowing out of the pipe.

9. The equipment for treating wastewater by anaerobic ammonium oxidation according to claim 8, wherein the immobilizing material is one of pellets and an immobilized bed.

10. The equipment for treating wastewater by anaerobic ammonium oxidation according to claim 9, wherein the immobilizing material is pellets of polyvinyl alcohol gel, alginic acid gel, polyethylene glycol gel, cellulose, polyester, polypropylene or vinyl chloride.

11. The equipment for treating wastewater by anaerobic ammonium oxidation according to claim 10, wherein the pellets are in a shape of a sphere, a cylinder, a porous material, a cube, a sponge or a honeycomb.

12. The equipment for treating wastewater by anaerobic ammonium oxidation according to claim 9, wherein the immobilizing material is an immobilized bed of polyethylene, polyester, polypropylene or vinyl chloride, or of active carbon fibers.

13. The equipment for treating wastewater by anaerobic ammonium oxidation according to claim 12, wherein the immobilized bed has a shape of a fiber, a chrysanthemum, or a honeycomb.

14. The equipment for treating wastewater by anaerobic ammonium oxidation according to claim 8, wherein a pressure gauge is installed upstream or downstream of the acclimatization vessel.

* * * * *